Dec. 27, 1927.　　　　　F. W. CALDWELL　　　　　1,653,943
PROPELLER HUB
Filed March 28, 1925　　　2 Sheets-Sheet 1
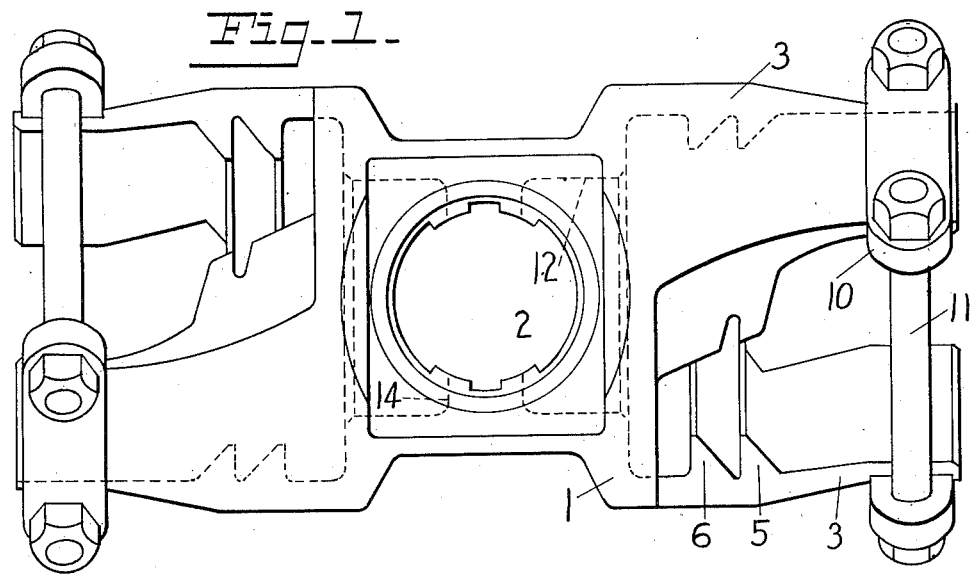
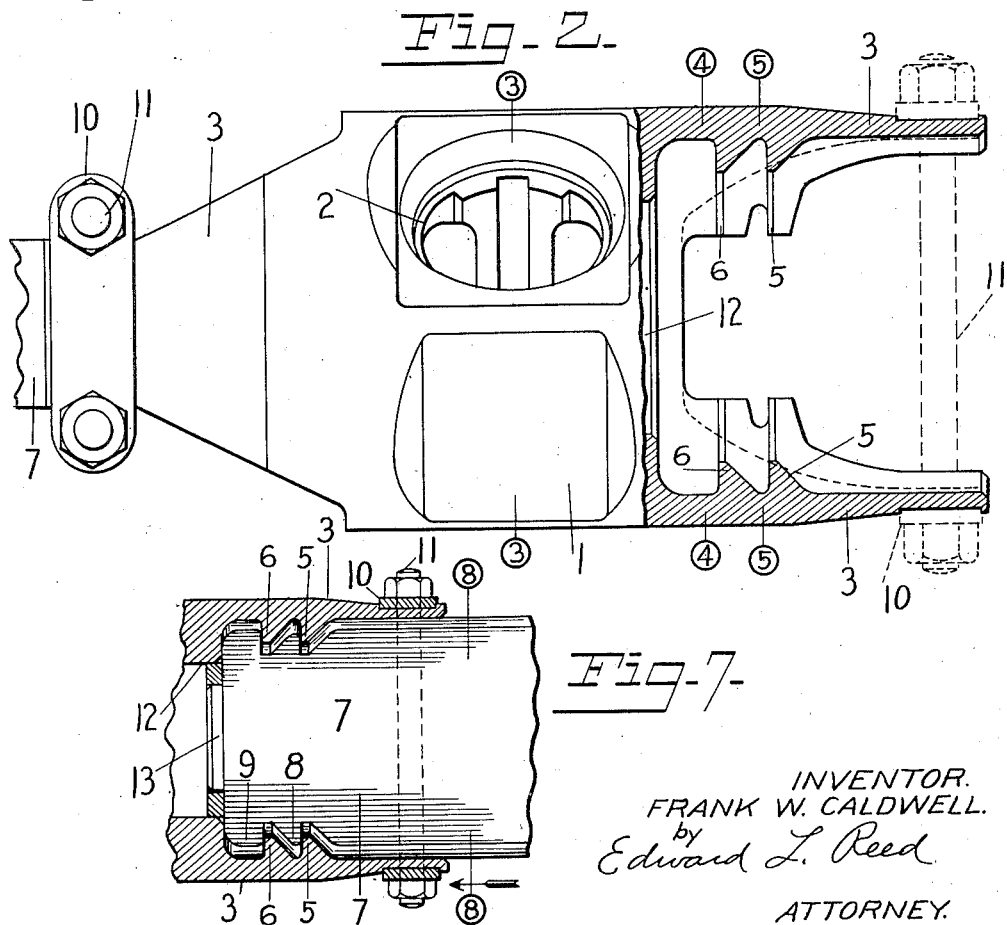
INVENTOR.
FRANK W. CALDWELL.
by Edward L. Reed
ATTORNEY.

Dec. 27, 1927.  1,653,943
F. W. CALDWELL
PROPELLER HUB
Filed March 28, 1925   2 Sheets-Sheet 2

ATTORNEY.
FRANK W. CALDWELL
by
Edward L. Reed
ATTORNEY.

Patented Dec. 27, 1927.

1,653,943

UNITED STATES PATENT OFFICE.

FRANK W. CALDWELL, OF DAYTON, OHIO, ASSIGNOR TO STANDARD STEEL PROPELLER COMPANY, A CORPORATION OF DELAWARE.

PROPELLER HUB.

Application filed March 28, 1925. Serial No. 19,046.

This invention relates to hubs for airplane propellers and the like.

Various means have been provided for attaching the blades of a propeller to the hub but the common method has been to screw thread them into sockets at the respective ends of the hub. With such a connection it is necessary to provide some means for retaining the blade in the socket and as a result it is more or less difficult to mount the blade in and remove the same from the socket. Further, it is very difficult to make the screw threads on all hubs exactly alike so that propeller blades will be interchangeable. Such a screw threaded connection also requires that the end or shank portion of the blade shall be cylindrical in shape and where it is desired to form the blade from a noncircular or flat bar of a thickness less than the diameter of the socket such a connection cannot be used to advantage.

One object of the present invention is to provide a propeller hub of a strong simple construction in which the blades may be quickly and easily mounted or dismounted.

A further object of the invention is to provide a one piece propeller hub in which the blade may be mounted without the use of screw threads.

A further object of the invention is to provide a propeller hub in which a blade having a noncircular or flat end portion or shank can be rigidly mounted.

A further object of the invention is to provide a hub of this kind in which the propeller blade may be adjustably mounted, to vary the pitch angle of the blade.

Other objects of the invention will appear as the device is described in detail.

Figure 3:
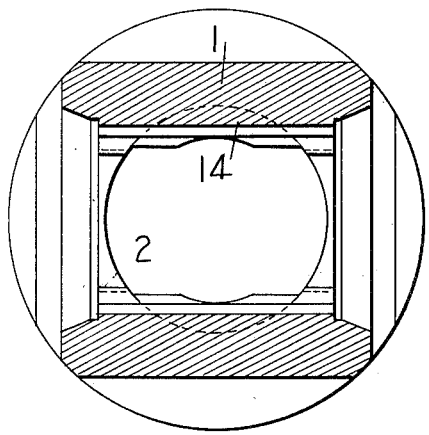
Figure 4:
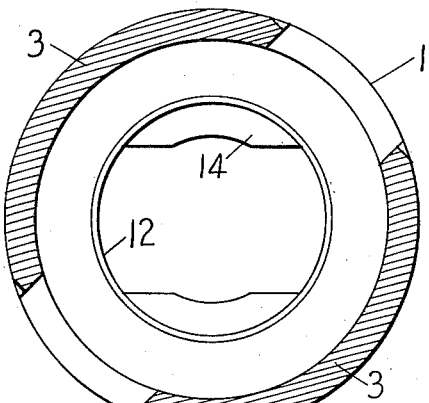
Figure 5:
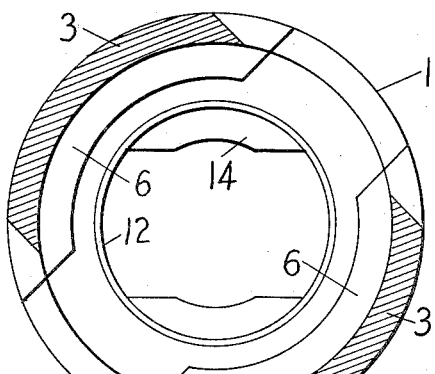
Figure 6:
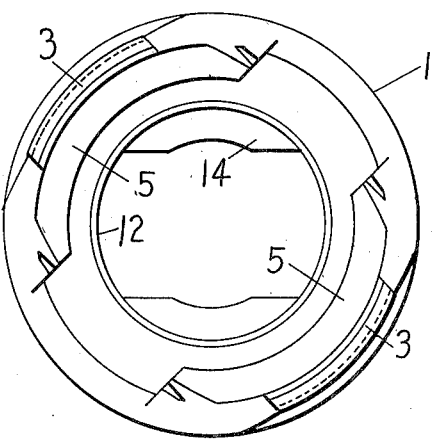
Figure 8:
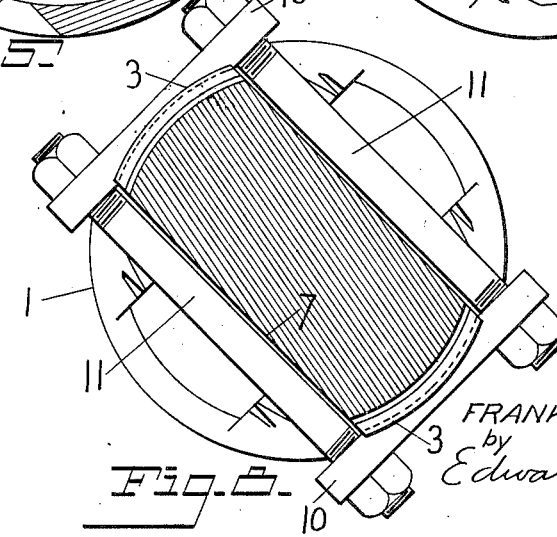

In the accompanying drawings Fig. 1 is a side elevation of a propeller hub embodying my invention; Fig. 2 is a similar view with the hub turned about its longitudinal axis to a different position and with one of the sockets in section; Fig. 3 is a section taken on the line 3—3 of Fig. 2; Fig. 4 is a section taken on the line 4—4 of Fig. 2; Fig. 5 is a section taken on the line 5—5 of Fig. 2; Fig. 6 is an end view of one of the sockets; Fig. 7 is a longitudinal sectional view through one of the sockets showing the propeller in position therein; and Fig. 8 is a section taken on the line 8—8 of Fig. 7.

In these drawings I have illustrated one embodiment of my invention and have shown the same as designed primarily for use in connection with airplane propellers but it will be understood that the invention may take various forms and that it may be utilized for various purposes.

In that embodiment of the invention here shown the hub comprises a body portion 1 which is preferably formed in a single piece and is provided at its longitudinal center with a transverse bore 2 to receive the propeller shaft. As here shown, this bore is designed to receive a bushing or adapter, whereby shafts of various diameters may be mounted in a bore of a fixed diameter. This body portion is provided at each end with a socket adapted to receive the end portion or shank of a propeller blade. Each socket is adapted to receive a non-circular or flat end portion or shank of a propeller blade and is provided with transversely extending shoulders adapted to cooperate with corresponding shoulders on the edge portions of said shank, and means are provided for rigidly securing the blade in the socket with said shoulders in engagement. In its preferred form the socket comprises two longitudinally extending members, which may be termed arms, and which are spaced apart a distance corresponding to the greatest diameter of the shank of the propeller blade. Preferably the socket is turned or otherwise formed of substantially cylindrical shape, but having its exterior surface tapered toward the blade so that the outer end portion thereof is of slightly less thickness than the inner portion, or that portion adjacent to the body of the hub. The opposite sides of this cylindrical socket are then cut away so as to provide longitudinal arms, as shown at 3, which are separated at their lateral edges by openings which also extend lengthwise of the socket. In the present instance, the lines along which the side portions are cut away are substantially parallel near the outer end portion of the socket and then diverge toward the body portion thereof, thus causing the lateral edges of each arm to converge outwardly toward the propeller blade and providing the same with substantially parallel edge portions near the outer end thereof. The arms 3 are provided on their adjacent faces, and preferably near the inner ends thereof, with transversely extending ribs 5 and 6, the inner faces of which constitute shoulders. These ribs or shoulders follow the cylindrical contour of the arms and are therefore arcuate in shape, and the adjacent ends of the corresponding ribs on the two arms are spaced apart at their adjacent ends by the openings in the sides of the socket. The propeller blade, as shown in Figs. 7 and 8, is provided with a flat shank or end portion 7 which is of a thickness considerably less than the diameter of the socket and of a width substantially equal to the diameter of that socket. The edge portions of this shank are curved about the longitudinal axis thereof so as to conform to the curvature of the socket and are provided near the inner end of the shank with transverse grooves, the outer walls of which constitute shoulders 8 and 9, which correspond to and cooperate with the shoulders 5 and 6 of the arms 3 of the socket. The end of the propeller blade is inserted in the socket with its flat portion extending transversely between the shoulders on the arms and when it has been moved inwardly far enough for the shoulders 8 and 9 to clear the shoulders 5 and 6 on the arms it is rotated about its longitudinal axis to bring the shoulders on the shank of the blade into interlocking engagement with the shoulders on the arms of the socket, thus positively locking the blade against outward movement. The distance between the shoulders 8 and 9 is equal to that between the shoulders 5 and 6 so that both shoulders of the shank will have bearing contact on the shoulders of the socket.

Any suitable means may be provided for securing the propeller blade in the socket but I prefer to provide a suitable clamping device by means of which the arms 3 may be drawn into firm clamping engagement with the shank of the blade. In the present construction, this clamping device comprises bars or clamping members 10 which extend across the outer portions of the arms 3 and are shaped to conform to the curved contour of the outer surface of these arms. Bolts 11 extend through the ends of the two arms, on opposite sides of the socket, and serve to draw the two arms of the socket into firm contact with the edge of the blade, thereby rigidly holding the blade against displacement with relation to the socket members. By loosening the clamping device the blade can be turned about its longitudinal axis in the socket to adjust the pitch angle of the blade and when the clamping device has been tightened down the blade will be held firmly in its adjusted position. When mounting the blade in the socket the shoulders on the blade and on the socket are brought into engagement and clamped in that position. Consequently there is no possibility of any outward movement of the blade with relation to the socket, after the propeller has been assembled and balanced, which would tend to destroy the balance of the propeller.

The inner end of the socket is preferably bored axially to provide a recess 12 into which extends a projection or boss 13 on the end of the shank of the blade and this boss serves to center the blade in the socket. If desired, the bore 12 may extend some distance into the body of the hub, as shown in Fig. 1, so as to lighten the same, but preferably the bore does not extend completely through the hub but terminates at one side of the center thereof so as to leave an integral portion in the hub, as shown at 14, which extends for the full length of the bore 2 and provides a keyway for the key, by means of which the hub is secured to the shaft.

It will be apparent that I have provided a propeller hub which is very simple in its construction, of a very strong durable character and which may be formed of a single piece of metal and in which the propeller blade may be mounted without the use of screw threads. The construction is such that the blade may be very quickly and easily mounted in or removed from the socket and, further, is of such a character that a blade having a flat or non-circular shank may be utilized, as is desirable when the blades are made of materials of certain kinds. The shoulders in the socket can be easily machined and caused to conform to standard specifications so that all hubs manufactured will be exactly alike and the propeller blades will be interchangeable. The construction is of such a character as to provide wide tolerances with the single exception of the distance between the two shoulders 5 and 6 on each arm, which distance must be such that the corresponding shoulders on the propeller blade will have bearing contact with the respective shoulders in the socket. The clamping device not only provides a quickly and easily operated means for securing the blade in the socket but it also permits of a ready adjustment of the blade to vary the pitch angle thereof.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A propeller hub comprising a body portion having means for attaching the same to a shaft and having at each end thereof a socket to receive the end of a propeller blade, each of said sockets having inwardly extending shoulders arranged about the axis of said socket and having their adjacent ends spaced apart to permit the corresponding shoulders on the end of the propeller blade to be moved lengthwise of said socket through spaces between the shoulders of said socket and then brought into cooperative relation to said shoulders of said socket by turning said propeller blade about its longitudinal axis, and means for securing said blade in said socket.

2. The combination with a propeller hub comprising a body portion having means for attaching the same to a shaft and having at each end thereof a socket to receive the end of a propeller blade, each of said sockets having inwardly extending shoulders arranged about the axis of said socket and having their adjacent ends spaced apart, of propeller blades having end portions adapted to be inserted in the respective sockets, the end portion of each blade having shoulders spaced about the axis thereof and arranged to pass through the spaces between the ends of the shoulders of its socket as said end portion is inserted in said socket and to be moved into interlocking relation to the shoulders of said socket when said blade is turned about its longitudinal axis, and means for securing the end portions of said blades in the respective sockets with their shoulders in interlocking engagement with the shoulders of said sockets.

3. The combination with a propeller hub comprising a body portion having means for attaching the same to a shaft and having at each end thereof a socket to receive the end of a propeller blade, each of said sockets having inwardly extending arcuate shoulders curved about the axis of said socket and having their adjacent ends spaced apart, of a propeller blade having a flattened end portion adapted to be inserted in said socket with its flattened portion between said shoulders and having on its edges shoulders arranged to be brought into interlocking engagement with the shoulders of said socket when said blade is turned about its longitudinal axis, and means for securing said blade in said socket with said shoulders in cooperating engagement.

4. The combination with a propeller hub comprising a body portion having means for attaching the same to a shaft and having at each end thereof a socket to receive the end of a propeller blade, each of said sockets having inwardly extending arcuate shoulders curved about the axis of said socket and having their adjacent ends spaced apart, said socket also having an axial recess at the inner end thereof, of a propeller blade having a flattened end portion adapted to be inserted in said socket with its flattened portion between said shoulders and having on its edges shoulders arranged to be brought into interlocking engagement with the shoulders of said socket when said blade is turned about its longitudinal axis, said blade also having on its inner end a part to enter the axial recess in said socket to center said blade therein, and means for securing said blade in said socket.

5. A propeller hub comprising a body portion having means for attaching the same to a shaft and having at each end thereof a socket to receive the end of a propeller blade, each of said sockets comprising arms extending lengthwise of said blade spaced apart to receive the end portion of said blade between them and having on their adjacent faces transversely extending shoulders to cooperate with the corresponding shoulders on said blade, and means for securing said blade in said socket.

6. A propeller hub comprising a body portion having means for attaching the same to a shaft and having at each end thereof a socket to receive the end of a propeller blade, each of said sockets comprising arms spaced apart and having on their adjacent faces transversely extending shoulders to cooperate with the corresponding shoulders on said blade, and a clamping device acting on said arms to cause said blade to be clamped between the same.

7. A propeller hub comprising a body portion having means for attaching the same to a shaft and having at each end thereof a substantially cylindrical socket, the opposite sides of which have been cut away to provide longitudinally extending openings at the opposite sides of said socket, said socket having inwardly extending transverse shoulders to cooperate with corresponding shoulders on a propeller blade, and means for securing said propeller blade in said socket.

8. A propeller hub comprising a body portion having means for attaching the same to a shaft and having at each end thereof a substantially cylindrical socket, the opposite sides of which have been cut away along outwardly converging lines to provide said socket with longitudinally extending arms, the adjacent edges of which are spaced apart, each of said arms having near its inner end transversely extending shoulders to cooperate with corresponding shoulders on a propeller blade, and means for securing said propeller blade in said socket.

9. A propeller hub having a transverse bore to receive a shaft and having at each end thereof a pair of longitudinally extending opposed arms arranged to receive between them the end of a propeller blade, the arms of each pair having near their inner ends transversely extending shoulders, arranged within the socket to cooperate with corresponding shoulders on said propeller blade, and means for clamping said propeller blade in position between said arms.

10. A propeller hub having a transverse bore to receive a shaft and having at each end thereof a pair of longitudinally extending opposed arms arranged to receive between them the end of a propeller blade, the arms of each pair having near their inner ends transversely extending shoulders, arranged within the socket to cooperate with corresponding shoulders on said propeller blade to hold said blade against lengthwise movement and permit said blade to be adjusted about its longitudinal axis, and means for securing said propeller blade in adjusted positions between said arms.

11. A propeller hub having a transverse bore to receive a shaft and having at each end thereof a pair of longitudinally extending opposed arms, the arms of each pair having their adjacent surfaces curved about the longitudinal axis of said hub, each of said arms having near the inner end thereof transversely extending ribs, the inner faces of which provide shoulders to cooperate with corresponding shoulders on a propeller blade, and a clamping device acting on the outer ends of said arms to cause said propeller blade to be clamped between the same.

12. The combination with a propeller hub having a transverse bore to receive a shaft and having at each end thereof a pair of longitudinally extending opposed arms, the arms of each pair having their adjacent faces curved about the longitudinal axis of said hub and having their adjacent edges spaced one from the other, and each of said arms having near its inner end transversely extending ribs, the inner faces of which constitute shoulders, of a propeller blade having a flattened end portion and adapted to be inserted between said arms with its flattened surfaces adjacent to the respective arms, said blade having at its respective edges shoulders arranged to be brought into interlocking relation with the corresponding shoulders on said arms when said blade is turned about its longitudinal axis, and means for securing said blade in position between said arms.

13. The combination with a propeller hub having a transverse bore to receive a shaft and having at each end thereof a pair of longitudinally extending opposed arms, the arms of each pair having their adjacent faces curved about the longitudinal axis of said hub and having their adjacent edges spaced one from the other, and each of said arms having near its inner end transversely extending ribs, the inner faces of which constitute shoulders, said hub also having an axial recess at the inner ends of said arms, of a propeller blade having a flattened end portion adapted to be inserted between said arms with its flat surface adjacent to the respective arms and having on its edges shoulders arranged to be brought into inter-locking relation to the shoulders on the respective arms when said blade is turned about its longitudinal axis, said blade also having a projection on the inner end thereof adapted to enter the axial recess in said hub and center said blade with relation to said arms, and means for securing said blade between said arms.

14. The combination with a propeller hub having a transverse bore to receive a shaft and having at each end thereof a pair of longitudinally extending opposed arms, the arms of each pair having their adjacent faces curved about the longitudinal axis of said hub and having their adjacent edges spaced one from the other, and each of said arms having near its inner end transversely extending ribs, the inner faces of which constitute shoulders, of a propeller blade having a flattened end portion and adapted to be inserted between said arms with its flattened surfaces adjacent to the respective arms, said blade having at its respective edges shoulders arranged to be brought into interlocking relation with the corresponding shoulders on said arms when said blade is turned about its longitudinal axis, clamping bars extending across the outer end portions of the respective arms, and bolts extending through said clamping bars and serving to draw the end portions of said arms into engagement with said blade.

15. In a propeller hub, a body portion having a transverse bore to receive a shaft and having at each end thereof a socket comprising a pair of longitudinally extending opposed members spaced one from the other to receive between them the end of a propeller blade, each of said members having its lateral edges converging outwardly from said body portion and having its inner portion of greater thickness than its outer portion, said members being provided near the inner ends thereof with transversely extending ribs, the inner surfaces of which constitute shoulders adapted to cooperate with corresponding shoulders on a propeller blade, and means acting on the outer portions of said arms to cause said propeller blade to be clamped between the same.

In testimony whereof, I affix my signature hereto.

FRANK W. CALDWELL.